United States Patent
Klein

(10) Patent No.: US 6,648,423 B1
(45) Date of Patent: Nov. 18, 2003

(54) HYDRAULIC BRAKE SYSTEM FOR REGULATED AND COMFORTABLE BRAKING

(75) Inventor: Andreas Klein, Bad Homburg (DE)

(73) Assignee: Continental Teves AG & Co. OHG, Frankfurt (DE)

(*) Notice: Subject to any disclaimer, the term of this patent is extended or adjusted under 35 U.S.C. 154(b) by 0 days.

(21) Appl. No.: 09/674,438

(22) PCT Filed: May 11, 1999

(86) PCT No.: PCT/EP99/03221
§ 371 (c)(1),
(2), (4) Date: Mar. 29, 2001

(87) PCT Pub. No.: WO99/58380
PCT Pub. Date: Nov. 18, 1999

(30) Foreign Application Priority Data

May 12, 1998 (DE) .......................................... 198 21 180
Nov. 2, 1998 (DE) .......................................... 198 50 386

(51) Int. Cl.⁷ .............................. B06T 7/12; B06T 8/48; B06T 13/68; B60K 31/06
(52) U.S. Cl. ....................... 303/10; 303/119.2; 303/191; 303/116.1; 303/113.2; 180/170
(58) Field of Search .......................... 303/10–12, 119.2, 303/119.1, 116.1–116.4, 138, 68, 69, 162, 115.1–115.6, 113.2; 701/70, 80, 97, 78, 93

(56) References Cited

U.S. PATENT DOCUMENTS

| | | | | | |
|---|---|---|---|---|---|
| 4,969,696 A | * | 11/1990 | Yogo et al. | | |
| 5,383,719 A | * | 1/1995 | Farr | ................ | 303/113.2 |
| 5,690,396 A | * | 11/1997 | Johnston et al. | ......... | 303/113.2 |
| 5,924,508 A | * | 7/1999 | Clauss et al. | ............... | 180/170 |
| 5,927,827 A | * | 7/1999 | Reuter et al. | ............ | 303/113.2 |
| 6,050,654 A | * | 4/2000 | Gegalski et al. | ......... | 303/119.2 |
| 6,485,113 B2 | * | 11/2002 | Riley et al. | ................. | 303/138 |
| 6,508,521 B2 | * | 1/2003 | Gegalski et al. | ............ | 303/139 |

FOREIGN PATENT DOCUMENTS

| | | |
|---|---|---|
| DE | 40 29 793 | 3/1992 |
| DE | 4312118 | * 10/1993 |
| DE | 43 35 676 | 4/1995 |
| DE | 43 40 467 | 6/1995 |
| DE | 195 37 927 | 4/1997 |
| DE | 195 42 654 | 5/1997 |
| DE | 195 45 010 | 6/1997 |
| DE | 197 12 732 | 10/1998 |
| DE | 197 25 298 | 12/1998 |

OTHER PUBLICATIONS

Search Report of the German Patent Office for Application No. 198 50 386.5.

* cited by examiner

*Primary Examiner*—Douglas C. Butler
(74) *Attorney, Agent, or Firm*—Rader, Fishman & Grauer PLLC

(57) ABSTRACT

The present invention relates to an improved hydraulic brake system for controlled and comfortable braking operations which includes a hydraulic pump for build-up of a hydraulic pressure that effects braking and a valve assembly by way of which the hydraulic pressure can be reduced, the hydraulic system being in particular characterized in that the valve assembly is an analog valve, and in that the analog valve and the hydraulic pump are adapted to be actuated by a control device in such a manner that the brake pressure for comfort braking can be increased or decreased in an essentially continuously variable manner.

9 Claims, 2 Drawing Sheets

HYDRAULIC BRAKE SYSTEM FOR REGULATED AND COMFORTABLE BRAKING

This application is a 371 of PCT/EP99/03221 filed May 11, 1999.

TECHNICAL FIELD

The present invention generally relates to vehicle braking systems and more particularly relates to a hydraulic brake system for controlled and comfortable braking operations.

BACKGROUND OF THE INVENTION

Hydraulic brake systems are increasingly equipped with devices which permit performing also independently controlled comfortable braking operations. In contrast to a controlled braking operation effected by a driver, which is generally related to traction and/or brake slip control, comfort braking is activated by a cruise control system, for example. One problem encountered in this matter, however, is that such a comfort braking operation must be carried out with a controlled brake force because otherwise the cruise control system cannot be operated with a sufficient rate of accuracy and continuity.

In view of the above, an object of the present invention is to provide a hydraulic brake system of the type mentioned hereinabove which allows applying a brake pressure that is continuously controllable in small steps for conducting comfortable braking operations.

The present invention includes an analog valve and a hydraulic pump both of which are adapted to be actuated by a control device in such a manner that the brake pressure for comfort braking can be increased or decreased in an essentially continuously variable manner.

In a preferred embodiment, the valve assembly is configured as an analog three-way valve provided for each wheel brake, the inlets of the valve being connected to the pressure side of the hydraulic pump, and the first outlet thereof being respectively connected to a wheel brake and the second outlets thereof being connected to a low-pressure side of the brake system, wherein the three-way valves and the hydraulic pump are actuatable by a control device to such effect that the brake pressure for a comfortable braking operation can be increased or decreased in an essentially continuously variable manner.

DETAILED DESCRIPTION OF THE PREFERRED EMBODIMENTS

Figure 1:
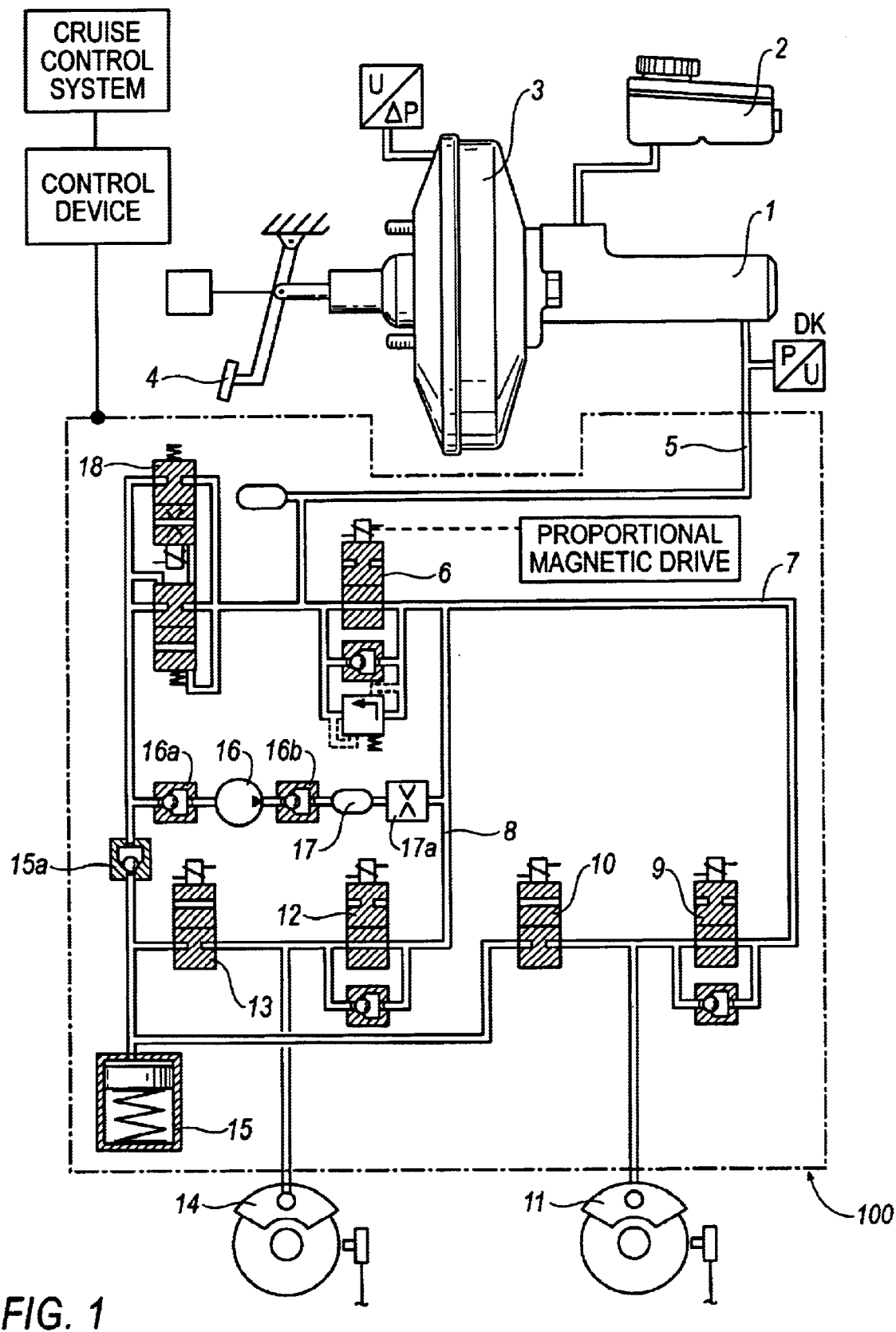
FIG. 1 is a basic circuit diagram showing the first embodiment.

Only one brake circuit 100 which acts upon two wheel brakes 11, 14 of a vehicle is respectively shown in the two Figures. The respectively other brake circuit for the other two wheel brakes has an identical design and, therefore, was omitted for the sake of clarity. According to FIG. 1, the brake circuits are acted upon by a master cylinder 1 which is supplied with hydraulic fluid by way of a hydraulic supply reservoir 2. The master cylinder 1 is actuated by a brake pedal 4 by way of a brake force booster 3.

Connected to the master cylinder 1 is a brake line 5 of the brake circuit 100, which line extends through an analog, normally open valve 6 and, at it's outlet, branches into a first brake branch 7 and a second, brake branch 8. The first brake circuit extends over a first, normally open inlet valve 9 into the first wheel brake 11, while the second brake branch 8 is connected to the second wheel brake 14 by way of a second, normally open inlet valve 12.

A connection to a low-pressure side of the brake circuit can be established by way of a first, normally closed outlet valve 10 at the first wheel brake 11. The same applies to a second, normally closed outlet valve 13 at the second wheel brake 14. The low-pressure side is acted upon by a first low-pressure accumulator 15 and is connectable to the hydraulic supply reservoir 2 by way of a first non-return valve 15a and a first, normally closed separating valve 18.

Additionally, the suction side of a hydraulic pump 16 is connected to the low-pressure side by way of a second non-return valve 16a. The pressure outlet of this pump extends via a third non-return valve 16b, a damping chamber 17, and an orifice 17a into the two brake branches 7, 8.

In view of a controlled braking operation (i.e., application of the brake pedal 4) effected by a driver, the function of the present embodiment corresponds to that of prior art brake circuits of this type, with the hydraulic pump and the related inlet and outlet valves being correspondingly actuated for traction or brake slip control purposes by means of sensors on each wheel brake.

The hydraulic pump 16 and the analog valve 6 are used in first place to carry out a comfortable braking operation, for example, by a cruise control system. The hydraulic pump 16 causes build-up of brake pressure in the brake branches 7, 8, while the brake pressure can be reduced by way of the analog valve 6. These variations of the brake pressure occur in an infinitely variable fashion because the hydraulic pump has a pulsed operation and/or the analog valve is opened gradually and controlled by an increase in cross-section.

In detail, the analog valve 6 is closed and the first separating valve 18 opened during pressure build-up. The hydraulic pump 16 may then aspirate hydraulic fluid from the hydraulic supply reservoir 2 connected to the master cylinder 1 and conduct it into the two brake branches 7, 8. During pressure decrease, the first separating valve 18 is closed, the hydraulic pump 16 deactivated and the analog valve 6 opened gradually.

These two operations may also take place permanently and alternatingly so that a continuous pressure control is possible in small steps.

The analog valve is preferably a seat valve having a proportionated magnet drive.

Figure 2:
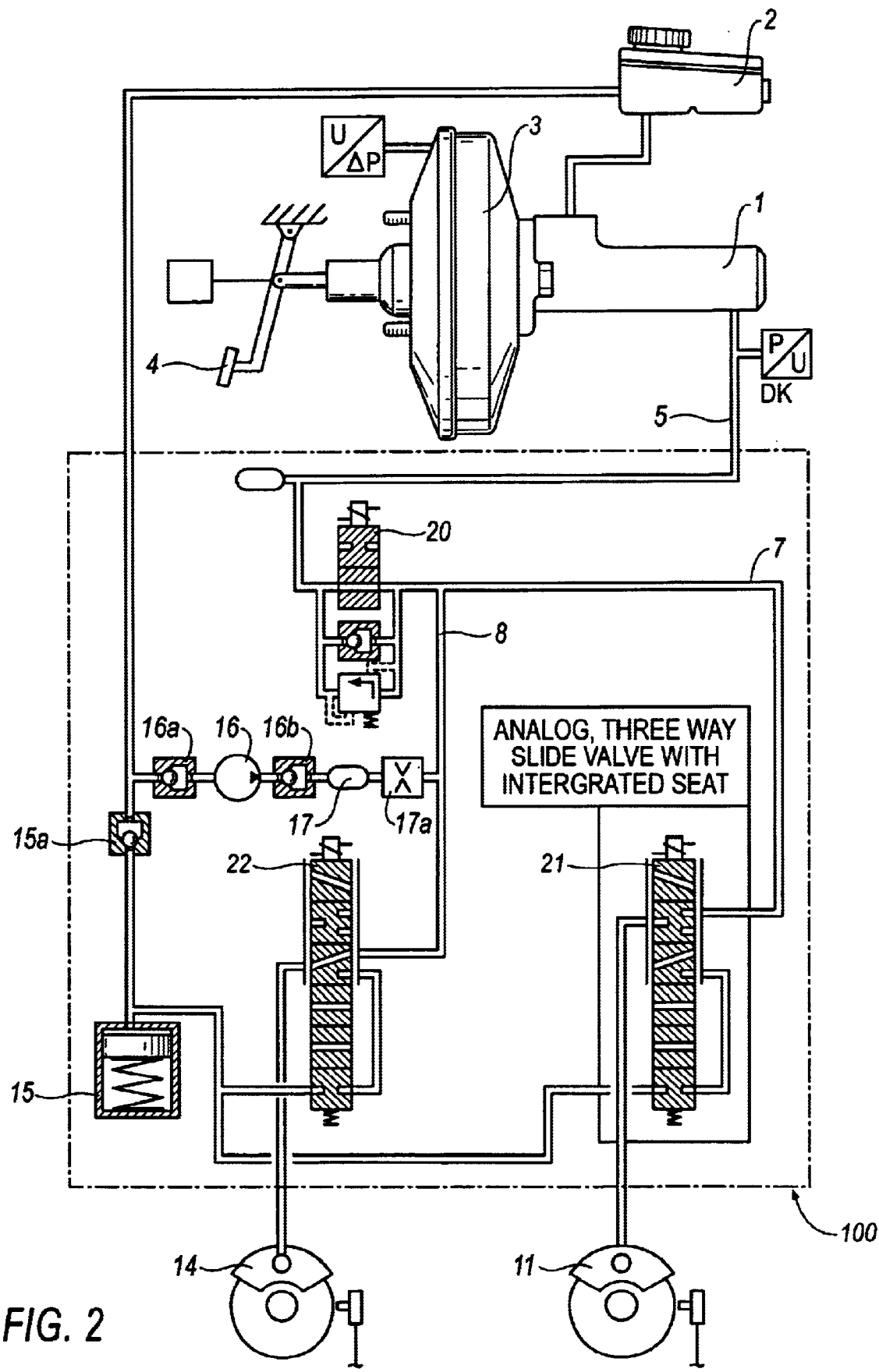
FIG. 2 is a basic circuit diagram showing the second embodiment.

FIG. 2 shows a second embodiment of the present invention. In this case, too, the two wheel brakes 11 and 14 are acted upon by way of the brake circuit 100 because the force exerted on the brake pedal 4 is boosted by the brake force booster 3 and transmitted into the hydraulic fluid by way of the master cylinder 1 which is connected to the hydraulic supply reservoir 2. The brake circuit 100 is connected to the master cylinder 1 by way of the brake line 5. The brake line 5 extends into the two brake branches 7, 8 by way of a second, normally open separating valve 20. The first brake branch 7 is connected to the inlet of a first three-way valve 21, to the first outlet of which the wheel brake 11 is connected and the second outlet of which is connected to the low-pressure side. The second brake branch 8 extends to a second three-way valve 22 having its first outlet connected to the wheel brake 14 and its second outlet connected to the low-pressure side.

The analog three-way valves are preferably slide valves with an integrated seat.

The low-pressure accumulator 15 acts upon the low-pressure side and is connected directly to the hydraulic supply reservoir 2 by way of the first non-return valve 15a. In this embodiment also, the suction side of the hydraulic pump 16 is connected to the low-pressure side by way of the second non-return valve 16a. The pressure side of the hydraulic pump 16 extends into the two brake branches 7, 8 by way of the third non-return valve 16b and the damping chamber 17 with an orifice 17a connected downstream thereof In the event of a controlled braking operation performed by a driver, the brake pressure is conducted into the brake branches 7, 8 by way of the brake line 5 and the second, normally open separating valve 20 and acts upon the associated wheel brake 11 and 14, respectively, by way of the first and second three-way valve 21, 22. Traction and brake slip control in turn is effected by the per se known actuation of the hydraulic pump 16 and the second separating valve 20 and the respective three-way valve 21 or 22 in case slip is sensed on the associated wheel. In this case, the three-way valve performs the functions of the inlet and outlet valves 9, 10 and 12, 13, respectively, as in FIG. 1.

In the event of al comfortable braking operation, the second separating valve 20 is closed and the hydraulic pump 16 operated in a pulsed manner for pressure increase so that the brake pressure in the wheel brakes 11, 14 is built up analogously, that means gradually in small steps, by way of the three-way valves 21, 22. The hydraulic pump 16 is deactivated for pressure reduction, and the three-way valves are actuated in steps continuously so that in each case the first outlet is connected analogously, that means with increasing cross-section, to the second outlet, with the result that the brake pressure is discharged gradually into the low-pressure side.

In this second embodiment, too, pressure increase and pressure reduction can take place permanently and alternatingly so that a continuous pressure control in small steps is possible.

In addition, it is possible with both embodiments to use pressure modulation to the end of assisting a controlled braking operation initiated by the driver, mainly above an operating point of a booster.

It should still be noted that the function of the analog valves which includes achieving a continuous and analog pressure reduction could also be brought about by a hydraulic pump which is operable with opposite rotation in order to return the brake fluid this way. In this case, the hydraulic pump would have to be controlled by an angular control (control mirror).

What is claimed is:

1. Hydraulic brake system for controlled and comfortable braking operations by a cruise control system, comprising:
    a hydraulic pump for build-up of a hydraulic pressure that effects braking, and
    a valve assembly in which the hydraulic pressure can be reduced or increased without use of a brake pedal, wherein the valve assembly is configured as an analog valve, wherein an inlet of the analog valve is connected to an outlet of the hydraulic pump, and a first outlet of the analog valve is connected to a wheel brake and a second outlet of the analog valve is connected to a low-pressure side of the brake system, and wherein the analog valve and the hydraulic pump are coupled to and actuated by a control device such that the hydraulic pressure for comfortable braking can be increased or decreased in an essentially continuously variable manner without use of the brake pedal by the cruise control system,
    wherein the analog valve is interposed between a pressure side of the hydraulic pump and a low-pressure side of the brake system, and the analog valve is opened in steps by the control device for brake pressure reduction, and
    wherein a suction side of the hydraulic pump is connectable to a hydraulic supply reservoir by way of a first separating valve, and the analog valve can be closed and the first separating valve opened by the control device for brake pressure increase.

2. Hydraulic brake system as claimed in claim 1, wherein the analog valve is normally open and the first separating valve is normally closed.

3. Hydraulic brake system as claimed in claim 1, wherein the analog valve is a seat valve having a proportionated magnet drive.

4. Hydraulic brake system as claimed in claim 1, wherein the hydraulic pump is adapted to be operated by the control device in a pulsed manner.

5. Hydraulic brake system as claimed in claim 1, wherein the valve assembly and the hydraulic pump with the control device is continuously operable to achieve a continuous pressure control.

6. Hydraulic brake system as claimed in claim 1, wherein the control device is adapted to be activated for assisting a manual actuation of the brake system.

7. Hydraulic brake system for controlled and comfortable braking operations by a cruise control system, comprising:
    a hydraulic pump for build-up of a hydraulic pressure that effects braking, and
    a valve assembly in which the hydraulic pressure can be reduced or increased without use of a brake pedal, wherein the valve assembly is configured as an analog three-way valve provided for each wheel brake, wherein an inlet of said valve is connected to an outlet of the hydraulic pump, and a first outlet of said valve is connected to a wheel brake and a second outlet of said valve is connected to a low-pressure side of the brake system, wherein each of the three-way valves and the hydraulic pump are actuatable by a control device such that the hydraulic pressure for comfortable braking can be increased or decreased in an essentially continuously variable manner without use of the brake pedal by the cruise control system,
    wherein the suction side of the hydraulic pump is directly connected to a hydraulic supply reservoir, and
    wherein the first outlet of a first one of said three way valves is connected stepwise to a second outlet of a second one of said three way valves at one of the by way of the control device for reduction of the brake pressure.

8. Hydraulic brake system as claimed in claim 7, further including a low-pressure accumulator connected to the low-pressure side, and wherein the control device is actuated by at least one of a traction or brake slip control system.

9. Hydraulic brake system as claimed in claim 7, wherein the analog three-way valve is a slide valve with an integrated seat.

* * * * *